United States Patent
Ng et al.

(10) Patent No.: US 12,341,362 B1
(45) Date of Patent: Jun. 24, 2025

(54) ADAPTIVE LAPTOP COMPUTER CHARGING SYSTEM

(71) Applicant: Bretford Manufacturing, Inc., Franklin Park, IL (US)

(72) Inventors: Hubert Benjamin Ki Durn Ng, Park Ridge, IL (US); David Johnson, San Francisco, CA (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 560 days.

(21) Appl. No.: 17/939,023

(22) Filed: Sep. 7, 2022

Related U.S. Application Data

(60) Provisional application No. 63/241,797, filed on Sep. 8, 2021, provisional application No. 63/241,118, filed on Sep. 7, 2021.

(51) Int. Cl.
```
H01M 10/44      (2006.01)
G06F 1/16       (2006.01)
H01M 10/46      (2006.01)
H02J 7/00       (2006.01)
```

(52) U.S. Cl.
CPC .......... *H02J 7/0013* (2013.01); *G06F 1/1632* (2013.01); *H02J 7/00032* (2020.01); *H02J 7/0044* (2013.01)

(58) Field of Classification Search
CPC .... H02J 7/00032; H02J 7/0044; H02J 7/0042; H02J 7/0013; G06F 1/1632
USPC ......................... 320/107, 110, 114, 125, 160
See application file for complete search history.

(56) References Cited

U.S. PATENT DOCUMENTS

| | | | | |
|---|---|---|---|---|
| 7,236,896 B2* | 6/2007 | Farkas | ...................... | G06F 1/26 702/60 |
| 7,324,876 B2* | 1/2008 | Ying | ................. | H02J 13/00002 337/16 |
| 7,524,876 B2* | 4/2009 | Takakura | ............. | C07D 277/68 548/146 |
| 7,715,951 B2* | 5/2010 | Forbes, Jr. | ............. | G01D 4/004 700/297 |
| 8,588,989 B1* | 11/2013 | Heath | ............... | H02J 13/00034 700/286 |
| 2009/0062970 A1* | 3/2009 | Forbes, Jr. | ............. | G06Q 10/06 700/295 |

* cited by examiner

Primary Examiner — Edward Tso
(74) Attorney, Agent, or Firm — Anderson Gorecki LLP

(57) ABSTRACT

A laptop computer storage system includes a power delivery system configured to negotiate charging Power Delivery Objects (PDOs) with each laptop computer connected to the computer storage system. The charging power delivery objects specify, for each laptop computer, the voltage and amount of current to be supplied to the particular laptop computer. Different charging power delivery objects are individually negotiated, and the computer storage system monitors the total amount of power being drawn by the connected set of laptop computers. As new laptop computers are connected to the computer storage system, power delivery objects that would cause the computer storage system to exceed a maximum power threshold are not presented to the newly connected laptop computer. As laptop computers become fully charged, the amount of current being drawn by the charged laptops will decrease, thus enabling additional charging power to be provided to other laptops within the computer storage system.

16 Claims, 4 Drawing Sheets

FIG. 4

| Power Delivery Object | | |
|---|---|---|
| Volts | Amps | Watts |
| 5V | 3A | 15W |
| 9V | 2.22A | 19.98W |
| 9V | 3A | 27W |
| 12V | 3A | 36W |
| 15V | 3A | 45W |
| 20V | 3A | 60W |
| 20V | 3.25A | 65W |

ADAPTIVE LAPTOP COMPUTER CHARGING SYSTEM

CROSS-REFERENCE TO RELATED APPLICATIONS

This application claims priority to U.S. Provisional Application 63/241,118, filed Sep. 7, 2021, and also claims priority to U.S. Provisional Application 63/241,797, filed Sep. 8, 2021, the content of each of which is hereby incorporated herein by reference.

FIELD

The present invention relates to laptop computer storage systems and, more particularly, to an adaptive laptop computer charging system configured to provide disparate power delivery objects to multiple connected laptop computers.

BACKGROUND

Groups of portable computing devices, such as laptop computers, tablet computers, and other computing devices, are commonly used in educational facilities to enrich the curriculum provided to students. Groups of portable computing devices can also be used in numerous other contexts, such as shared devices in retail, healthcare, logistics/warehousing, food service, etc. As used herein, the term "laptop computer" will be used to refer to any of these types of portable computing devices.

Laptop computer storage systems, such as deck and wall mounted cabinets, charging lockers, and laptop computer carts, have been developed which may be used to store groups of laptop computers and to synchronize and charge the laptop computers while they are being stored. Generally, a laptop computer storage system that is wall or desk mounted is used within one location, such as in a particular classroom, whereas a laptop computer cart has castors that enable the group of laptop computers to be moved between locations within the facility, such as between classrooms.

Laptop computer storage systems commonly are plugged into a wall outlet (mains power) to enable the laptop computers that are stored therein to be charged. It is common for a wall outlet to be able to provide 15 amps of power at 120 volts, which results in a total of 1800 watts of available power. Applying a safety factor of 80%, this results in a total of 1440 watts that may be used to charge the connected laptops. Since a large number of laptop computers (e.g., up to 40 laptop computers) may be stored in a given laptop computer storage system, allocation of charging power within the laptop computer storage system is important to ensure that the laptop computer storage system does not exceed its total system power budget or mains power budget.

SUMMARY

All examples and features mentioned below can be combined in any technically possible way.

In some embodiments, a laptop computer storage system includes a power delivery system configured to negotiate charging Power Delivery Objects (PDOs) with each laptop computer connected to the laptop computer storage system. The charging power delivery objects specify, for each laptop computer, the voltage and amount of current to be supplied to the particular laptop computer. Different charging power delivery objects are individually negotiated, and the laptop computer storage system monitors the total amount of power being drawn by the connected set of laptop computers. As new laptop computers are connected to the laptop computer storage system, power delivery objects that would cause the laptop computer storage system to exceed a maximum power threshold are not presented to the newly connected laptop computer. As laptop computers become fully charged, the amount of current being drawn by the charged laptop computers will decrease, thus enabling additional charging power to be provided to other laptop computers within the laptop computer storage system.

By limiting the maximum charging rate allowed by any particular laptop computer, it is possible to optimize for more devices to charge at once. Rather than prioritizing a small number of devices, and allowing those devices to consume a majority of the total system power budget by charging at higher rates, by negotiating power delivery objects with each laptop computer it is possible to simultaneously charge a larger number of laptop computers using a smaller, less expensive, power supply.

BRIEF DESCRIPTION OF THE DRAWINGS

FIG. 4 is chart containing a selection of electrical parameters used to implement a selected set of example power delivery objects, according to some embodiments.

DETAILED DESCRIPTION

This disclosure is based, at least in part, on the realization that it would be desirable to provide an adaptive laptop computer charging system configured to provide disparate power delivery objects to multiple connected laptop computers.

Figure 1:
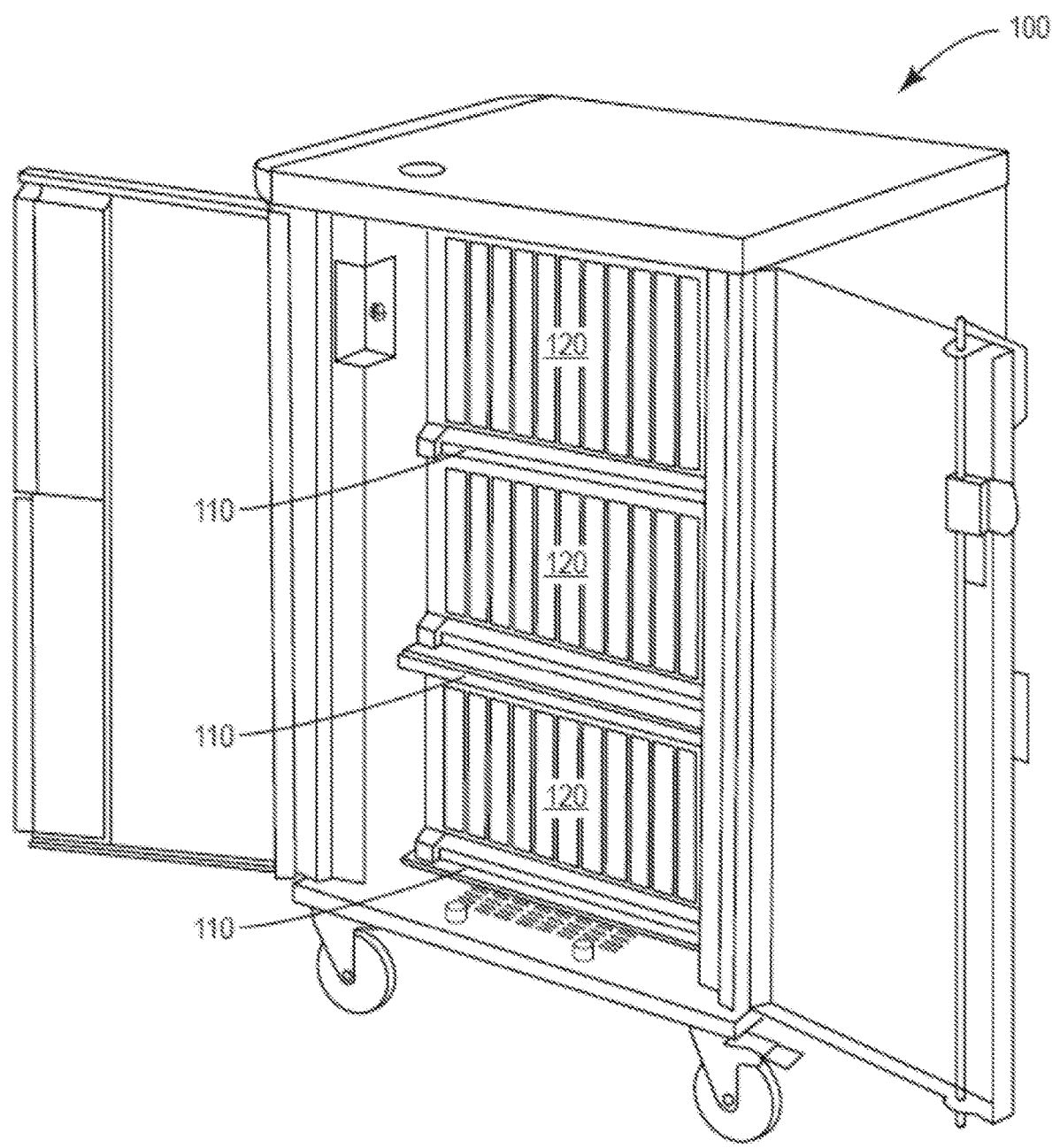
FIG. 1 is a front perspective view of an example laptop computer storage system implemented as a laptop computer cart, according to some embodiments.

FIG. 1 is a front perspective view of an example laptop computer storage system implemented as a laptop computer cart, according to some embodiments. Although some embodiments of a laptop computer storage system will be described in connection with a laptop computer cart, it should be understood that the adaptive laptop computer charging system may be used with other types of laptop computer storage systems as well, such as desktop laptop computer storage systems, wall mounted laptop computer storage systems, and charging lockers.

In the implementation shown in FIG. 1, the laptop computer storage system 100 has three shelves 110. Other laptop computer storage systems 100 may have other numbers of shelves 110. In some embodiments, one of the shelves is implemented as the floor of the laptop computer storage system 100. A shelf unit 120 is disposed on each of the shelves 110, and includes a plurality of dividers 124 which define storage bays for laptop computers 230. Charging cords (not shown) or docking hardware is provided in each of the storage bays to enable the laptop computers to be connected to the adaptive laptop computer charging system while contained in the laptop computer storage system 100, to enable the laptop computers to be charged. The particular number of storage bays will depend on the implementation, but in some embodiments the laptop computer storage system 100 has up to 40 storage bays to enable the laptop computer storage system to hold up to 40 laptop computers. Likewise, the particular form factor, such as the placement and number of doors, whether the laptop computers are accessed from the front or the top of the laptop computer storage system, will depend on the particular implementation.

Figure 2:
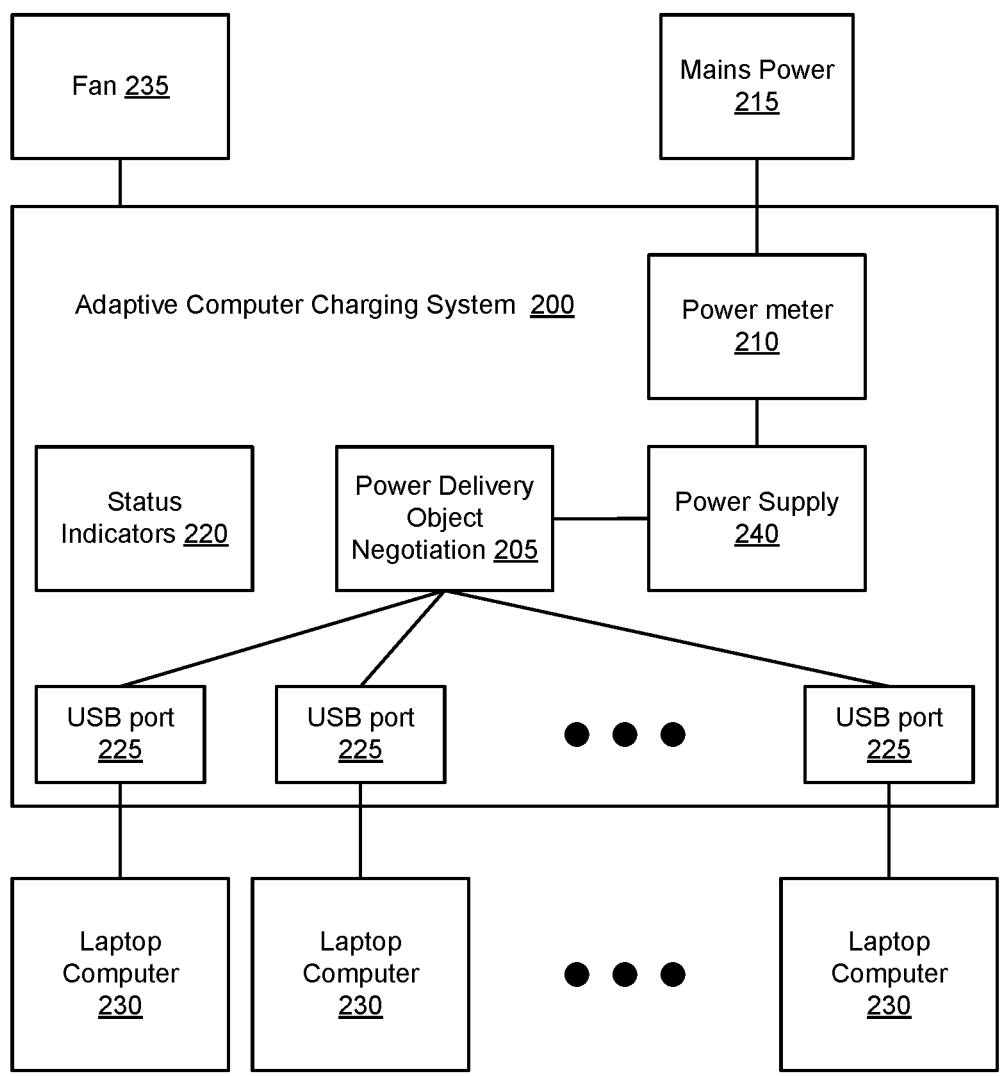
FIG. 2 is a functional block diagram of an example adaptive laptop computer charging system configured to provide disparate power delivery objects to multiple connected laptop computers, according to some embodiments.

FIG. 2 is a functional block diagram of an example adaptive laptop computer charging system configured to provide disparate power delivery objects to multiple connected laptop computers, according to some embodiments. As shown in FIG. 2, in some embodiments an adaptive laptop computer charging system 200 includes a Power Delivery Object Negotiation module 205 configured to negotiate power delivery objects with laptop computers 230 as the laptop computers connect to USB ports 225.

In some embodiments, the adaptive laptop computer charging system keeps track of the power required by each attached device (adjusting if necessary) and maintains a running total to derive the total system power. The adaptive laptop computer charging system also factors in power consumption from other known system components, such as power consumption by fans 235 for thermal management, which are preemptively deducted from the total system power budget.

Optionally, the adaptive laptop computer charging system 200 also includes a power meter 210 connected to mains power 215 to monitor a total amount of power being consumed by the set of laptop computers 230 that are charging within laptop computer storage system 100 and the other electrical components of the laptop computer charging system.

In some embodiments, the adaptive laptop computer charging system 200 may also include additional features, such as LED status indicators 220 configured to display the charge status of each of the laptop computers 230 connected to the adaptive laptop computer charging system 200. The status indicator LEDs may also be used to indicate to the user when a device is connected, but currently waiting to receive power due to a lack of remaining power budget. The status indicators LEDs can also provide other status indications, depending on the implementation.

As shown in FIG. 2, the power delivery object negotiation module 205 is configured to negotiate power delivery objects with laptop computers 230 as the laptop computers connect to USB ports 225. In some embodiments, the USB ports 225 are implemented as USB-C ports, and the power delivery object negotiation is implemented using the USB Power Delivery (USB-PD) specification. For example, in some embodiments, the power delivery object negotiation module 205 generates a source capabilities message that presents a set of power delivery objects to the laptop computer when the laptop computer first connects to the USB port 225. In some embodiments, power delivery object negotiation module 205 is implemented using a microcontroller having firmware embedded therein to implement a power delivery object negotiation process. To prevent the set of laptop computers 230 from exceeding the amount of available power from mains power 215, in some embodiments the power delivery object negotiation module 205 receives a signal from power meter 210 indicative of the total amount of power currently being consumed by the set of laptop computers 230 connected to the adaptive laptop computer charging system 200 and by the other system components of the laptop computer storage system.

Figure 3:
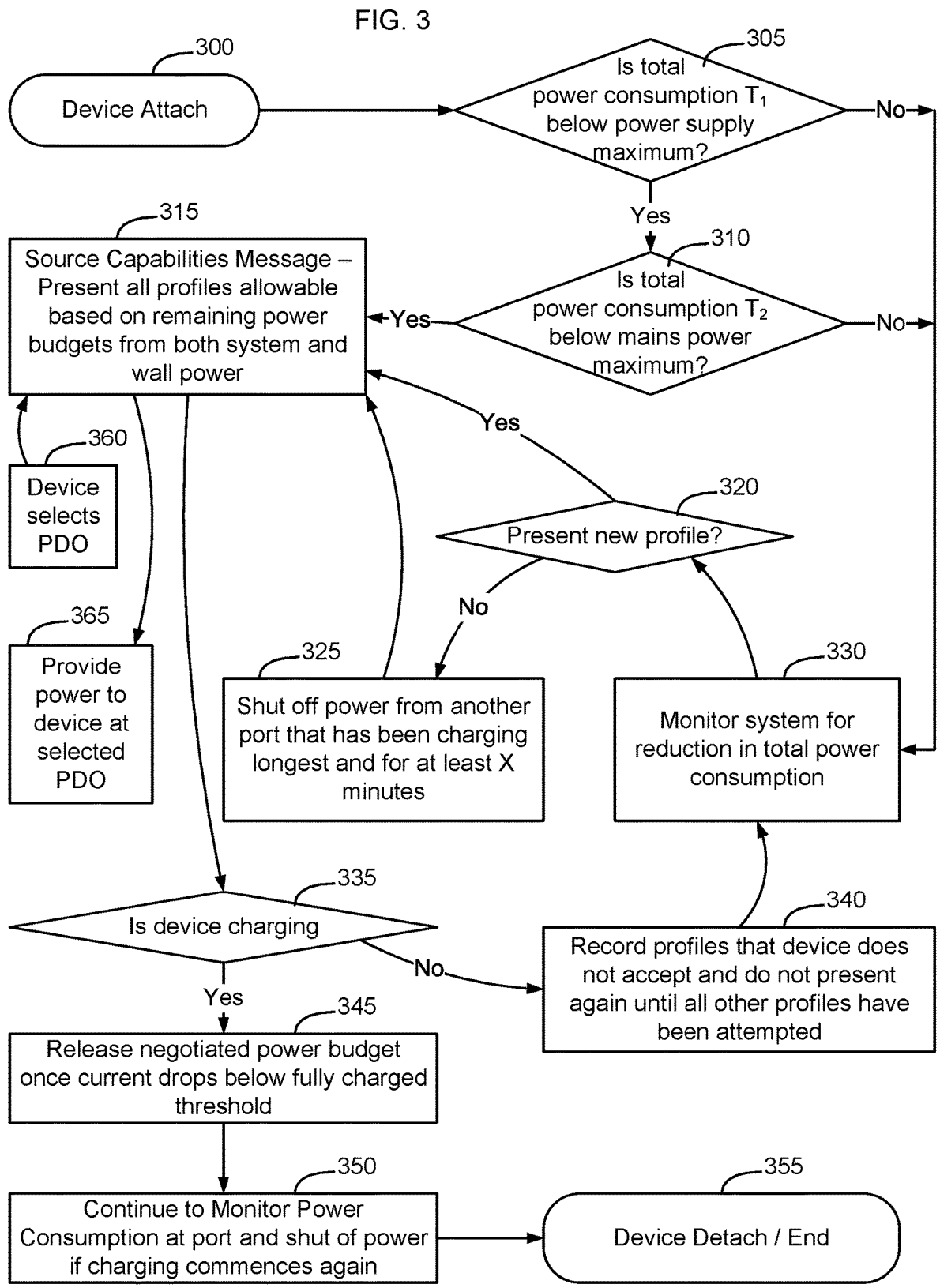
FIG. 3 is a flow chart of an example process implemented by the adaptive laptop computer charging system of FIG. 2 in connection with negotiating power delivery objects with attached laptop computers, according to some embodiments.

FIG. 3 is a flow chart of an example process implemented by the adaptive laptop computer charging system of FIG. 2 in connection with negotiating power delivery objects with attached laptop computers, according to some embodiments. As shown in FIG. 3, when a device attaches to the adaptive laptop computer charging system 200 (block 300) the adaptive laptop computer charging system 200 determines from power meter 210 if the total system power consumption is less than a threshold $T_1$, such as 15 W, below the maximum amount of power available from the power supply 240 (block 305). In some embodiments the threshold $T_1$ is based on the lowest wattage power delivery object. For example, if the lowest wattage power delivery object is 5V at 3 A=15 W, the example process may use 15 W as the threshold $T_1$ because, if the remaining maximum available power from the power supply is less than 15 W, it is not possible to negotiate a power delivery object with the attached device without exceeding the total power budget of the power supply of the adaptive laptop computer charging system 200.

If the amount of total system power consumption is not less than the threshold below system maximum power budget available from the power supply 240 (a determination of NO at block 305), it is not possible to provide power to the newly connected laptop computer. Accordingly, the adaptive laptop computer charging system will not immediately negotiate a power delivery object with the newly attached laptop computer, but will instead monitor the laptop computer storage system 100 for a reduction in total power consumption (block 330). Once the power consumption has reduced, or after a chosen time interval (e.g., after 10 minutes) (block 320), the adaptive computer charging system 200 will negotiate a power delivery object with the newly attached laptop computer.

If the total system power consumption is more than the threshold $T_1$ (e.g., 15 W) lower than the maximum power available from the power supply (a determination of YES at block 305), in some embodiments an additional check is performed to determine if the total system power is more than a second threshold $T_2$, (e.g., 15 W) lower than an amount of power available from mains power (block 310). In some embodiments, the amount of power that is available from mains power is assumed to be 1440 Watts (e.g., assuming mains power is delivered at 120 V through a 15 A wall circuit, and applying an 80% threshold). If the total system power is not less than a threshold (e.g., 15 W) below the amount of power available from mains power (a determination of NO at block 310), it is not possible to provide power to the newly connected laptop computer. Accordingly, the adaptive laptop computer charging system will not negotiate a power delivery object with the newly attached laptop computer, but will instead monitor the laptop computer storage system 100 for a reduction in total power consumption (block 330).

If the total system power consumption more than 15 Watts lower than the 1440-Watt power budget (A determination of YES at block 310), the adaptive laptop computer charging system 200 will generate a source capabilities message that is passed to the newly attached laptop computer 230 over USB port 225 (block 315). The source capabilities message, in some embodiments, presents all power deliver objects available to the laptop computer, based on the remaining power budgets from both the system and wall power. An example set of possible power delivery objects are shown in FIG. 4, although other power delivery objects may be used as well depending on the embodiment.

As shown in FIG. 4, some power delivery objects are associated with higher wattage values, whereas other power delivery objects are associated with lower wattage values. Where the higher wattage power delivery objects would cause the total system power to exceed the total system power budget, or the mains power budget, these power delivery objects are not included in the system capabilities message. For example, if the total system power and/or mains power usage values indicate that the adaptive laptop computer charging system 200 can provide at most 50 W to the newly attached device, the source capabilities message will not include any power delivery objects that would exceed 50 W. Thus, in FIG. 4, in this scenario, the 20V/3 A and 20V/3.25 A power delivery objects would not be included in the source capabilities message that is sent to the newly connected laptop computer, since selection of one of those two power delivery objects would require 60 W and 65 W, respectively, both of which would cause the adaptive laptop computer charging system to exceed the total system power or mains power budget.

Once the source capabilities message is presented to the attached laptop computer 230, the attached laptop computer will respond with a preferred power delivery object that should be used to provide power to the attached laptop computer (block 360). The adaptive laptop computer charging system 200 will then supply power via USB port 225 associated with the attached laptop computer 230, based on the selected power delivery object (block 365). For example, if the attached laptop computer 230 selected a 9V/3 A power delivery object, the adaptive laptop computer charging system 200 will supply 9V/3 A power on the USB connector 225 where the attached laptop computer 230 is connected to the adapted laptop computer charging system 200.

A check is then performed to determine if the attached laptop computer is charging (block 335). If the device is not charging (a determination of NO at block 335) it is likely that the selected power delivery object is incompatible with the power requirements of the attached laptop computer. In some embodiments, the adaptive laptop computer charging system 200 records the power delivery object that the device did not accept (block 340). In some embodiments, the adaptive laptop computer charging system will then attempt to present other power delivery objects to the attached laptop computer, but will not present that particular power delivery object to the attached device until all other power delivery objects have been attempted.

The adaptive laptop computer charging system 200 will proceed to monitor the system for a reduction in total power consumption (block 330) to determine if it is possible to assign a new power delivery object to the newly attached laptop computer. For example, in some embodiments, the adaptive laptop computer charging system 200 will wait for 10 minutes, and then determine whether power consumption has dropped enough to present a power delivery object to the newly attached device (other than the previously presented power delivery objects that the device was not able to use to accept charging power) (block 320).

If the adaptive laptop computer charging system 200 determines that it is possible to present a new power delivery object to the attached laptop computer (a determination of YES at block 320), the adaptive laptop computer charging system 200 will generate a new source capabilities message identifying a set of available power delivery objects, based on the available system and mains power and excluding the power delivery objects previously rejected by the attached laptop computer.

In some embodiments, after a chosen time interval (e.g. after 10 minutes), if the adaptive laptop computer charging system 200 determines that it is not possible to present an alternate power delivery object to the attached laptop computer, for example, because the total system power is still too high (a determination of NO at block 320) the adaptive laptop computer charging system 200 will shut off power from another port that has been charging the longest and for at least a certain period of time, e.g., 10 minutes (block 325). This will reduce the amount of power drawn by the system sufficiently to enable the adaptive laptop computer charging system 200 to be able to present a set of power delivery objects to the newly attached laptop computer via generation of a source capabilities message (block 315).

Once a power delivery object has been selected for an attached laptop computer, the adaptive laptop computer charging system 200 will periodically check to determine whether the attached laptop computer is charging (block 335). If the attached laptop computer is charging (a determination of YES at block 335) the adaptive laptop computer charging system 200 will release the negotiated power budget for the connected laptop computer once the current provided to the attached laptop computer drops below the fully charged threshold (block 345). Stated differently, once the laptop computer is fully charged, additional power will not be provided to the laptop computer, thus enabling the charging power to be allocated to other laptop computers within the laptop computer storage system 100.

In some embodiments, the adaptive laptop computer charging system 200 will continue to monitor power consumption at the port and shut off power if charging commences again (block 350). If the laptop computer is detached from the port (block 355) the process of providing power to the attached laptop computer ends. If the same laptop computer or a new laptop computer is subsequently connected to the same USB port 225, the process of negotiating a power delivery object for the newly attached laptop computer starts at block 300.

The process shown in FIG. 3 is implemented for each laptop computer independently, as each laptop computer connects to the adaptive laptop computer charging system 200. In this manner, the adaptive laptop computer charging system 200 is able to negotiate a unique power delivery object for each laptop computer, based on the capabilities of the laptop computer as well as the capabilities of the adaptive laptop computer charging system 200 and the overall power consumption of the laptop computer storage system.

In some embodiments, once a power delivery object has been assigned to a given laptop computer, the adaptive computer charging system will continue using that power delivery object to provide power to the attached laptop computer until the laptop computer is fully charged, or until the laptop computer is disconnected from the adaptive computer charging system. In other embodiments, the adaptive computer charging system may re-negotiate power delivery objects with laptop computers periodically, based on total system power consumption or mains power consumption. For example, if a small subset of the computers have been assigned high wattage power delivery objects, and the total system consumption is approaching the maximum budget, in some embodiments the adaptive computer charging system may turn off power to the computers that have high wattage power delivery objects and then send new source capabilities messages to each of those computers with a set of lower wattage power delivery objects. By renegotiating power delivery objects, it is possible to distribute power within the laptop computer storage system more equitably, when the laptop computer storage system is fully occupied, while also enabling faster charging (using higher wattage power delivery profiles) when the laptop computer storage system is charging a smaller number of computers.

FIG. 4 is chart containing a selection of electrical parameters used to implement select power delivery objects, according to some embodiments. As shown in FIG. 4, an adaptive laptop computer charging system 200 may have the ability to present multiple power delivery objects to attached laptop computers. Different laptop computers may be capable of receiving power at different voltage and current levels, and accordingly different laptop computers may preferentially select different power deliver objects. For example, a first type of laptop may be able to charge its battery using power between 12V and 15V, whereas a second type of laptop may be able to charge its battery using power between 5V and 9V. Accordingly, the adaptive laptop computer charging system 200 is configured to present a selection of power delivery objects to attached laptop computers using source capabilities messages, to enable the attached laptop computers to determine what power delivery objects the power source is able to generate, and enable the attached laptop computers to select an available power delivery object that is suitable for charging the attached laptop computer.

In some embodiments, when the adaptive laptop computer charging system 200 generates a source capabilities message, the adaptive laptop computer charging system 200 only includes those power delivery objects that are available based on the total system power budget and the total mains power budget. Specifically, any power delivery object that has a wattage value that would cause the adaptive laptop computer charging system 200 to exceed the total system power budget or mains power budget, will not be included in the source capabilities message. In this manner, the adaptive laptop computer charging system will not present options to the attached laptop computer that would cause the adaptive laptop computer charging system to exceed either its total system power budget or mains power budget. Rather, the adaptive laptop computer charging system 200 will present the newly attached device with a set of lower wattage power delivery objects, thus ensuring a larger number of attached laptop computers are able to be provided with charging power without exceeding either the total system power budget or mains power budget.

The methods described herein may be implemented as software configured to be executed in control logic such as contained in a Central Processing Unit (CPU) or Graphics Processing Unit (GPU) of an electronic device such as a laptop computer. In particular, the functions described herein may be implemented as sets of program instructions stored on a non-transitory tangible laptop computer readable storage medium. The program instructions may be implemented utilizing programming techniques known to those of ordinary skill in the art. Program instructions may be stored in a laptop computer readable memory within the laptop computer or loaded onto the laptop computer and executed on laptop computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any combination thereof. Programmable logic can be fixed temporarily or permanently in a tangible non-transitory laptop computer readable medium such as random-access memory, a laptop computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling differential power levels to be provided to individual laptop computers electrically connected to receive charging power from a laptop computer storage system, comprising:

detecting connection of a first laptop computer to the laptop computer storage system;

comparing a current amount of electrical power consumed by the laptop computer storage system with a first threshold below a maximum amount of power available from a power supply of the laptop computer storage system;

comparing the current amount of electrical power consumed by the laptop computer storage system with a second threshold below a maximum amount of power available from mains power;

when the current amount of electrical power consumed by the laptop computer storage system is greater than either the first threshold or the second threshold, monitoring the system for a reduction in total power;

when the current amount of electrical power consumed by the laptop computer storage system is less than both the first threshold and the second threshold, providing a source capabilities message to the first laptop computer, the source capabilities message identifying a set of power delivery objects available to be provided by the laptop computer storage system to the first laptop computer;

receiving a response to the source capabilities message from the first computer, the response to the source capabilities message identifying a select one of the power delivery objects; and providing power, by the laptop computer storage system to the first computer, in conformance with the selected one of the power delivery objects.

2. The method of claim 1, wherein each power delivery object specifies a voltage level and amperage level.

3. The method of claim 1, wherein both the first threshold and the second threshold are based on a minimum wattage value of one of the set of available power delivery objects.

4. The method of claim 1, further comprising determining an amount of current being drawn by the first laptop computer to determine if the first laptop computer is charging.

5. The method of claim 4, when the amount of current being drawn by the first computer is below a first amount:
   determining that the first laptop computer is not charging;
   recording the selected one of the power delivery objects as not compatible with the first laptop computer; and
   providing a second source capabilities message to the first laptop computer, the source capabilities message identifying a subset of power delivery objects available to be provided by the laptop computer storage system to the first laptop computers;
   wherein the subset of power delivery objects does not include the power delivery object that has been recorded as not compatible with the first laptop computer.

6. The method of claim 5, wherein the first amount is based on an amperage level of the selected one of the power delivery objects.

7. The method of claim 4, when the amount of current being drawn by the first computer is consistent with an amperage level of the selected one of the power delivery objects, the method further comprising:
   monitoring the amount of current being drawn by the first computer over time to determine when the amount of current being drawn by the first laptop computer has decreased to a level that is below a fully charged threshold.

8. The method of claim 7, further comprising stopping application of power at the selected power delivery object in response to a determination that the amount of current being drawn by the first laptop computer has decreased below the fully charged threshold.

9. A laptop computer storage system configured to provide differential power delivery objects to individual laptop computers electrically connected to receive charging power from the laptop computer storage system, comprising:
   a set of storage areas configured to contain a set of laptop computers; and
   an adaptive charging system, the adaptive charging system being configured to electrically connect to the set of laptop computers to provide charging power to at least some of the laptop computers while contained within the laptop computer storage system, the adaptive charging system being configured to:
   detect connection of a first laptop computer to the laptop computer storage system;
   compare a current amount of electrical power consumed by the laptop computer storage system with a first threshold below a maximum amount of power available from a power supply of the laptop computer storage system;
   compare the current amount of electrical power consumed by the laptop computer storage system with a second threshold below a maximum amount of power available from mains power;
   when the current amount of electrical power consumed by the laptop computer storage system is greater than either the first threshold or the second threshold, monitor the system for a reduction in total power;
   when the current amount of electrical power consumed by the laptop computer storage system is less than both the first threshold and the second threshold, provide a source capabilities message to the first laptop computer, the source capabilities message identifying a set of power delivery objects available to be provided by the laptop computer storage system to the first laptop computer;
   receive a response to the source capabilities message from the first computer, the response to the source capabilities message identifying a select one of the power delivery objects; and
   provide power, by the laptop computer storage system to the first computer, in conformance with the selected one of the power delivery objects.

10. The laptop computer storage system of claim 9, wherein each power delivery object specifies a voltage level and amperage level.

11. The laptop computer storage system of claim 9, wherein both the first threshold and the second threshold are based on a minimum wattage value of one of the set of available power delivery objects.

12. The laptop computer storage system of claim 9, wherein the adaptive charging system further configured to determine an amount of current being drawn by the first laptop computer to determine if the first laptop computer is charging.

13. The laptop computer storage system of claim 12, wherein when the amount of current being drawn by the first computer is below a first amount, the adaptive charging system further configured to:
   determine that the first laptop computer is not charging;
   record the selected one of the power delivery objects as not compatible with the first laptop computer; and
   provide a second source capabilities message to the first laptop computer, the source capabilities message identifying a subset of power delivery objects available to be provided by the laptop computer storage system to the first laptop computers;
   wherein the subset of power delivery objects does not include the power delivery object that has been recorded as not compatible with the first laptop computer.

14. The laptop computer storage system of claim 13, wherein the first amount is based on an amperage level of the selected one of the power delivery objects.

15. The laptop computer storage system of claim 12, when the amount of current being drawn by the first computer is consistent with an amperage level of the selected one of the power delivery objects, the adaptive charging system further configured to:
   monitor the amount of current being drawn by the first computer over time to determine when the amount of current being drawn by the first laptop computer has decreased to a level that is below a fully charged threshold.

16. The laptop computer storage system of claim 15, wherein the adaptive charging system further configured to stop application of power at the selected power delivery object in response to a determination that the amount of current being drawn by the first laptop computer has decreased below the fully charged threshold.

* * * * *